Aug. 25, 1964
H. J. GRAVES
3,145,860
WHEELED SUPPORT DEVICE FOR FLAT TIRES OF VEHICLE
Filed July 5, 1963
2 Sheets-Sheet 1
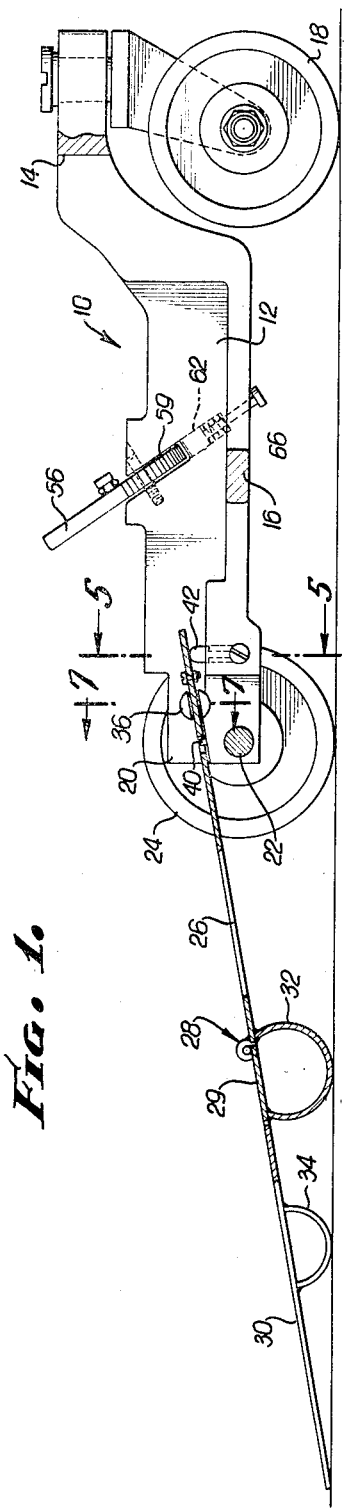
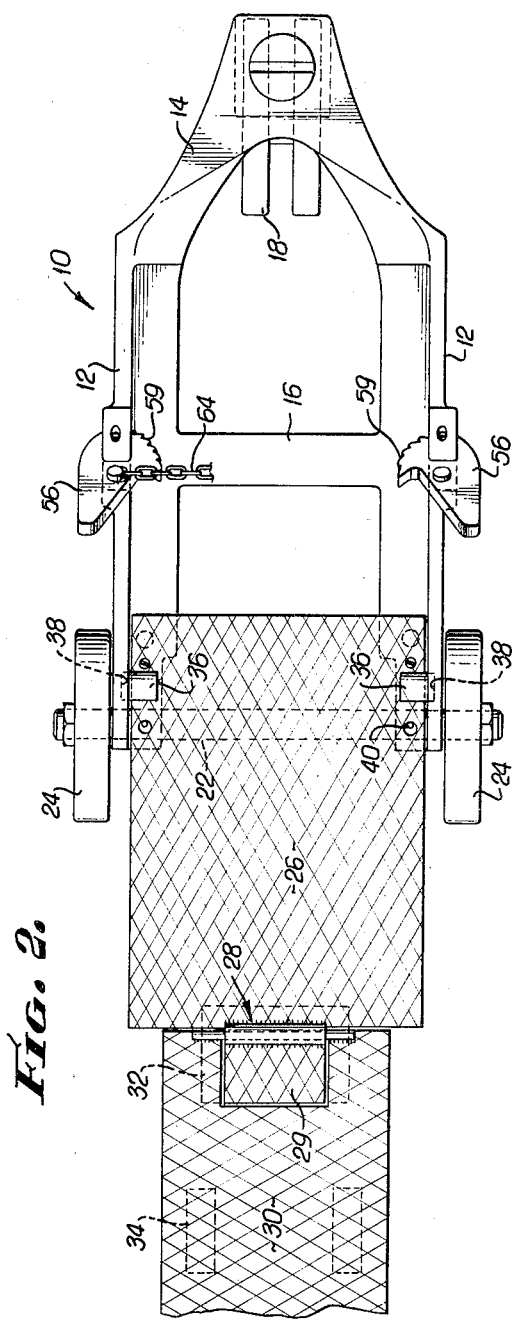
INVENTOR.
HENRY J. GRAVES
BY John Joseph Hall
ATTORNEY Aug. 25, 1964     H. J. GRAVES     3,145,860
WHEELED SUPPORT DEVICE FOR FLAT TIRES OF VEHICLE
Filed July 5, 1963     2 Sheets-Sheet 2
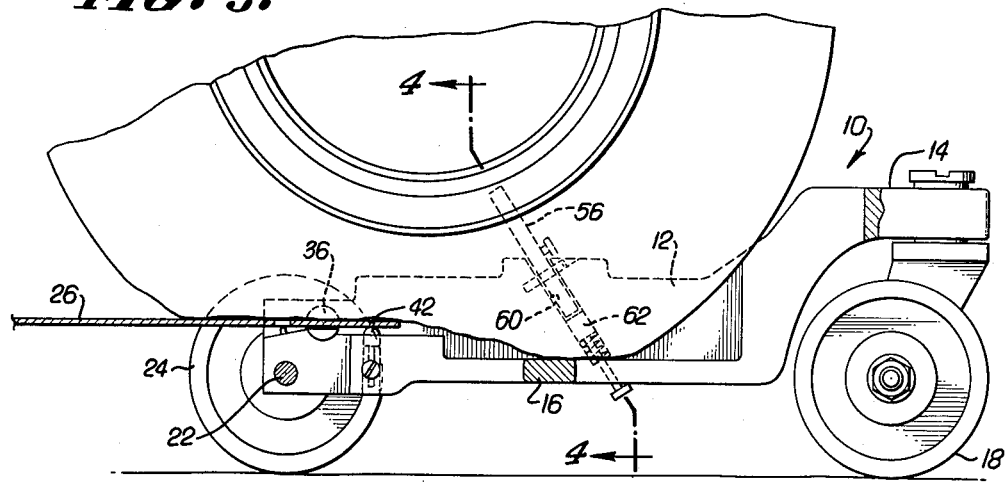
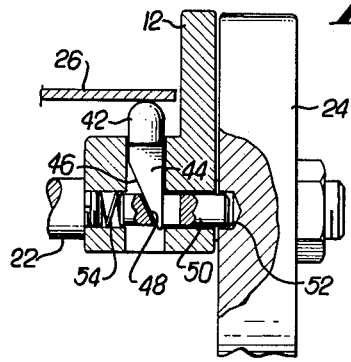
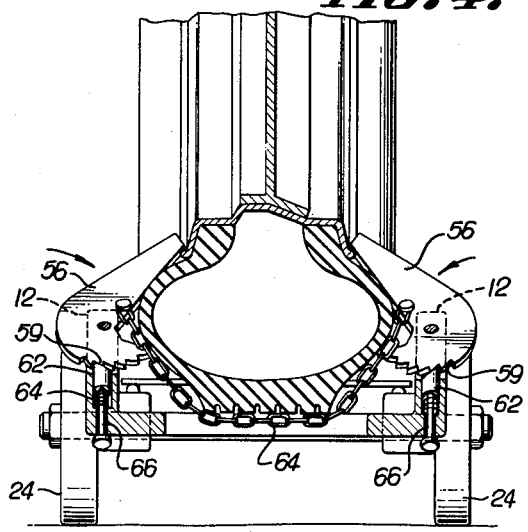
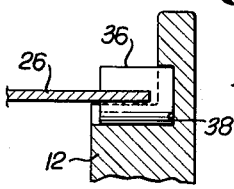
INVENTOR.
HENRY J. GRAVES
BY John Joseph Hall
ATTORNEY

United States Patent Office 3,145,860
Patented Aug. 25, 1964

3,145,860
WHEELED SUPPORT DEVICE FOR FLAT TIRES OF VEHICLE
Henry J. Graves, 15122 Roxford St., Sylmar, Calif.
Filed July 5, 1963, Ser. No. 293,069
1 Claim. (Cl. 214—334)

This invention relates to a device which can be used to support a flat tire of a vehicle and will provide a wheeled support for the vehicle as a substitute for the flat tire and which will permit operation of the vehicle for a considerable distance.

With more and more vehicles on highways, the total number of flat tires is constantly increasing. Moreover, it is becoming increasingly difficult and dangerous to repair or replace a flat tire on high-speed highways, especially since there are relatively few exits on such highways. Thus, access to gasoline stations or garages for help and for repair or replacement of flat tire of vehicle is becoming more difficult.

A great need exists for a self-help device which can be used as a replacement for a flat tire and which will allow a vehicle with a flat tire to be operated and to be driven to a garage or to a gasoline station for replacement or repair of the flat tire. Such a self-help device must be easy to use and operate, even by a woman driver.

It is, therefore, an object of my invention to provide a device which has wheels and can be used to support a flat tire of a vehicle.

Another object of my invention is to provide a wheeled support for a flat tire of a vehicle which will permit the vehicle to be driven to a place of safety or to a garage or gasoline station for repair or replacement of the flat tire.

A further object of my invention is to provide such a device which will allow the vehicle with the flat tire to be driven for a substantial distance without the need to replace or repair the flat tire.

A still further object of my invention is to provide a wheeled device which can support a flat tire of a vehicle and would allow operation of the vehicle, which device is relatively easy to use even by a woman driver.

These and other objects will be more readily understood by reference to the following specification and claim, taken in conjunction with the accompanying drawings, in which—

FIG. 1 is a sectional view in elevation showing an embodiment of my invention ready for operation.

FIG. 2 is a top plan view of FIG. 1.

FIG. 3 is a view similar to FIG. 1 but showing my invention in operation in conjunction with a flat tire of vehicle.

FIG. 4 is a section taken on line 4—4 of FIG. 3.

FIG. 5 is a detail view taken on line 5—5 of FIG. 1.

FIG. 6 is a perspective view of an embodiment of my invention in operation in conjunction with a flat tire of a vehicle.

FIG. 7 is a detail view taken on line 7—7 of FIG. 1.

As shown in the drawings, a preferred embodiment of my invention consists of a device having a frame 10 with two parallel side members 12 joined into an elevated V-shaped front end 14. A transverse bar member 16 acts as a brace between the side members 12 of the frame 10.

A caster 18 is mounted on the front end 14. The rear end 20 of the frame 10 is supported by an axle 22 with wheels 24.

For wheeling a flat tire of a vehicle onto my device, my invention is provided with a movable ramp consisting of a front ramp member 26 connected by hinges 28 on a tongue 29 of the front ramp member to a rear ramp member 30 by a pin 31 inserted through the hinges 28 and welded at each end to the rear ramp member 30. This arrangement provides a means for spreading out the weight of the vehicle and its flat tire over both the front ramp member 26 and the rear ramp member 30. Half tube 32 is rigidly mounted to the underside of front ramp member 26 for additional support. Similarly, half tube 34 is rigidly mounted to the underside of rear ramp member 30 for additional support. The front ramp member 26 is connected to the rear end of the frame 10 by pins 36 which are slotted to receive the sides of the front ramp member 26. The pins 36 fit into sockets 38 formed in the inner sides of the side member 12 of the frame 10. A stop 40 mounted on the front ramp member 26 limits forward travel of the movable ramp.

While the ramp is receiving a flat tire of a vehicle, the wheels 24 of the device are locked in position by a plunger mechanism consisting of plungers 42 having projections 44 with tapered ends 46 fitting into beveled slots 48 of locking pins 50 inserted into holes 52 in the wheels 24. The pins 50 are maintained in locking position by springs 54.

My device has a tire holding mechanism consisting of arcuate holding bars 56 having ratchets 59 formed on their lower surfaces. The bars 56 are pivotally mounted to the side members 12, and fit into slots 60 cut at an angle of about 45 degrees to the vertical into the top of side members 12.

Pawls 62 for maintaining the holding bars 56 in position are urged upwards in holding position by springs 64 around extension pins 66 which extend up through holes in the transverse bar 16. The pawls 62 are connected to the ends of the extension pins 68.

The holding bars 56 are connected by a chain 64 which also receives the flat tire of a vehicle.

In the operation of the invention, a vehicle with a flat tire is driven so that the flat tire rolls up the rear ramp member 30 and then the front ramp member 26 of my device while it is in the ready position illustrated in FIG. 1 of the drawings. While the flat tire is rolling up the ramp, the wheels 24 are locked in place by the locking pins 50. When the flat tire reaches the end of the ramp, the front ramp member 26 along with the rear ramp member 30 assumes a horizontal position due to the weight of the vehicle.

As the front ramp member 26 and rear ramp member 30 assume a horizontal position, the front ramp member 26 presses down on plungers 42. As plungers 42 move downward, tapered ends 46 urge locking pins 50 inwards and away from the holes 52 in wheels 24, thereby releasing the wheels 24.

Meanwhile, the flat tire is received by chain 64 and the vehicle's weight pulls holding bars 56 into contact on each side of the tire, thereby maintaining the tire in position between the front end 14 and the transverse bar 16. The ratchets 60 in conjunction with pawls 62 lock the flat tire in place.

The vehicle is now ready to be driven to a suitable place for repair of the flat tire. My device permits the vehicle to be driven a substantial distance in miles and at speeds up to twenty miles per hour even with the flat tire. Upon arrival at a garage or other suitable repair institution, the flat tire is first released from the holding bars 56 by pulling down on the extension pins 66 which release the pawls 62 and allow the holding bars 56 to resume their original position. As the vehicle is driven slowly backwards, the front ramp member 26 and rear ramp member 30 return from a horizontal position to their original position as shown in FIG. 1 of the drawings. As the ramp members assume their original position, the pressure of front ramp member 26 on plungers 42 is released, allowing the plungers 42 to move upwards and the locking pins outwards through holes 52 thereby locking the wheels 24. In this way, the flat tire may be safely rolled back on the ground as the vehicle is driven slowly backwards. My device is then ready for use again.

Otherwise, the hinges 28 permit the rear ramp member 30 to be folded over to rest on the top of the front ramp member 26. Thus, my invention can be conveniently carried in the trunk of a vehicle and is easily portable.

All of the component parts of my invention may be made of any material having the requisite strength to support the weight of a vehicle while in operation as well as standing still. Various metals such as iron alloys, aluminum, and magnesium may be used and suitable plastics also.

While I have described my invention in detail with reference to the accompanying drawings illustrating a preferred embodiment of my invention, it is understood that numerous changes in the details of the construction and arrangement of parts may be made without departing from the spirit and scope of the invention as hereinafter claimed.

I claim:

A wheeled support device for flat tires of a vehicle comprising, a frame having parallel side members forming a V-shaped front end of the frame and an axle on wheels at the rear end of the frame, a caster mounted at the front end of the frame, a pair of arcuate bars having ratchets formed on their lower sides and pivotally mounted to the side members of the frame, pawl members for holding the arcuate bars in position, a front ramp member pivotally connected to the rear end of the frame, a rear ramp member hinged to the rear end of the front ramp member, said ramp members forming a ramp over which a flat tire of a vehicle may be rolled from the ground on the wheeled support device, and chain means connecting the arcuate bars to receive the flat tire while on the vehicle.

References Cited in the file of this patent
UNITED STATES PATENTS

| | | |
|---|---|---|
| 2,350,118 | Knapp | May 30, 1944 |
| 2,573,728 | Pugh | Nov. 6, 1951 |
| 2,608,312 | Day | Aug. 26, 1952 |
| 2,661,856 | Stanley et al. | Dec. 8, 1953 |
| 2,776,063 | Larson | Jan. 1, 1957 |